United States Patent [19]

Kitamura et al.

[11] Patent Number: 4,914,803
[45] Date of Patent: Apr. 10, 1990

[54] MACHINE TOOL

[75] Inventors: Koichiro Kitamura, Takoaka; Shigeru Yamada, Fukuoka, both of Japan

[73] Assignee: Kitamura Machinery Co., Ltd., Takaoka, Japan

[21] Appl. No.: 238,189

[22] Filed: Aug. 30, 1988

[30] Foreign Application Priority Data

Aug. 23, 1988 [JP] Japan ................................ 63-207252

[51] Int. Cl.⁴ ........................................... B23Q 3/157
[52] U.S. Cl. ..................................................... 29/568
[58] Field of Search ........................................ 29/568

[56] References Cited

U.S. PATENT DOCUMENTS 4,372,728 2/1983 Murakami .......................... 29/568 X
4,557,035 12/1985 Rutschle et al. ....................... 29/568

*Primary Examiner*—Steven C. Bishop
*Attorney, Agent, or Firm*—Ronald P. Kananen

[57] ABSTRACT

A machine tool comprising a spindle head, a tool magazine, and an arm, the arm being secured to the spindle head, the arm having gripping members for holding a tool holder. When a workpiece is machined, the arm in which gripping members are opened is placed near the spindle. As soon as machining is completed, the grip members are closed so as to hold the tool holder set into the spindle. The end face of the spindle and the end face of the tool magazine stand at different levels when the spindle head is located in tool changing position. When a used tool is returned to the tool magazine, the arm operates in the following steps: first, the arm grips the used tool set into the spindle; second, the arm is moved so as to draw the tool from the spindle; and third, the arm is swiveled so as to return the tool to the tool magazine.

10 Claims, 8 Drawing Sheets

MACHINE TOOL

BACKGROUND OF THE INVENTION

This invention relates to a machine tool equipped with an automatic tool changer.

A conventional machine tool with an automatic tool changer has an arm for interchanging tools. The arm is attached to a column or a base of the machine tool.

When a workpiece is machined, a spindle is rotated and a spindle head is moved. Until the machining is completed, the arm of the automatic tool changer is retained at a waiting position away from the spindle. Once machining with the tool set into the spindle is completed, the arm is moved toward the spindle so as to grip and draw out the tool.

On the other hand, after the arm returns the used tool to a tool magazine, the arm is retracted and maintained away from the tool magazine. The tool magazine is indexed so that a new tool is sent to the tool changing position. Next, the arm is again moved toward the tool magazine so as to grip the new tool.

Further, in the conventional machine, the end face of the spindle is located at the same level or plane as the end face of the tool magazine. When exchanging tools, the arm is moved in the following manner. First, the arm gripping the used tool set into the spindle is moved in a parallel motion so as to withdraw the used tool. Next, the arm is swiveled to a position beneath the tool magazine. Finally, the arm is moved toward the tool magazine in a parallel motion so as to return the tool into the tool magazine.

Because the arm uselessly moves in such a manner, the mechanism of the arm cannot be simple and the tool changing operation cannot be finished in a short time.

SUMMARY OF THE INVENTION

The object of this invention is to provide a machine tool in which tools can be exchanged in a short time without useless movements of the tool-exchanging arm.

According to the invention, there is provided a machine tool including a spindle head in which a spindle is mounted, a tool magazine for storing a plurality of tools, and an arm for exchanging tools, the arm being secured to the spindle head and having gripping members for holding a tool holder.

When a workpiece is machined, the arm in which the gripping members are opened is positioned near the spindle. As soon as machining is over, the gripping members are closed so as to hold the tool holder set into the spindle, after which the tool is exchanged for a new tool stored in the tool magazine.

According to this invention, there is also provided a machine tool comprising a spindle head in which a spindle is mounted, a tool magazine for storing a plurality of tools and an arm for exchanging tools, in which the end of the spindle face and the end face of the tool magazine are located at different levels when the spindle head is located in a tool changing position.

When a used tool is returned to the tool magazine, the arm is operated in the following steps: in a first step, the arm grips the used tool set into the spindle; in the second step, the arm is moved so as to draw the tool from the spindle; and in the third step, the arm is swiveled so as to return the tool to the tool magazine.

In the machine tool according to this invention, tools are exchanged in such a manner that tools can be exchanged in a short time.

DESCRIPTION OF THE PREFERRED EMBODIMENT

Figure 1:
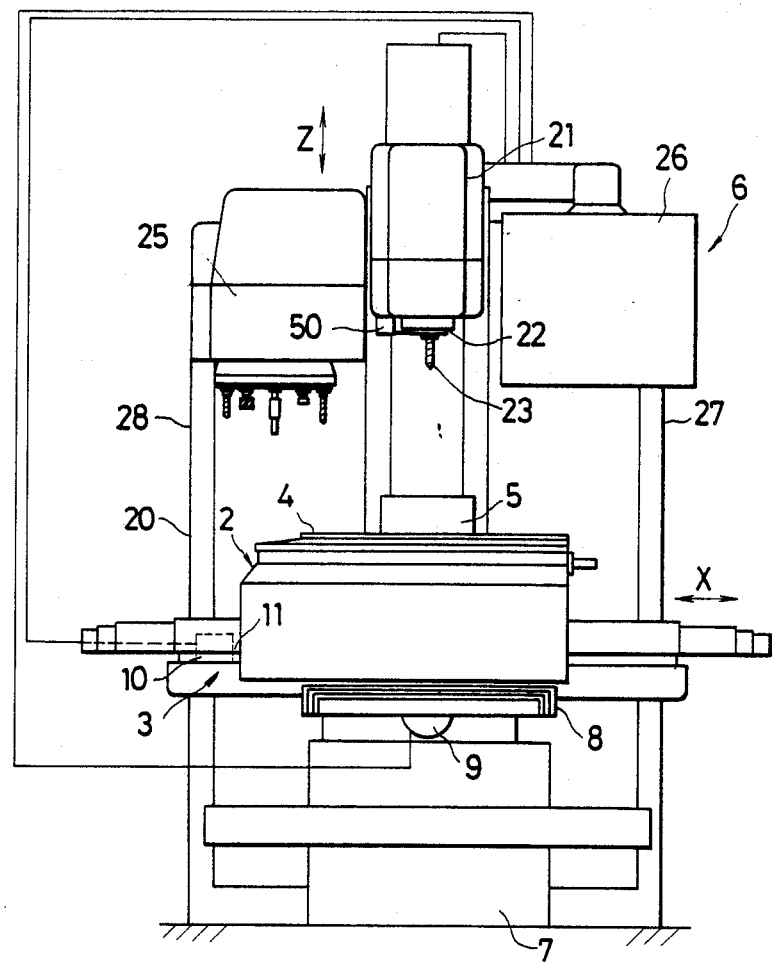
FIG. 1 is a front view showing a machine tool according to this invention.
Figure 2:
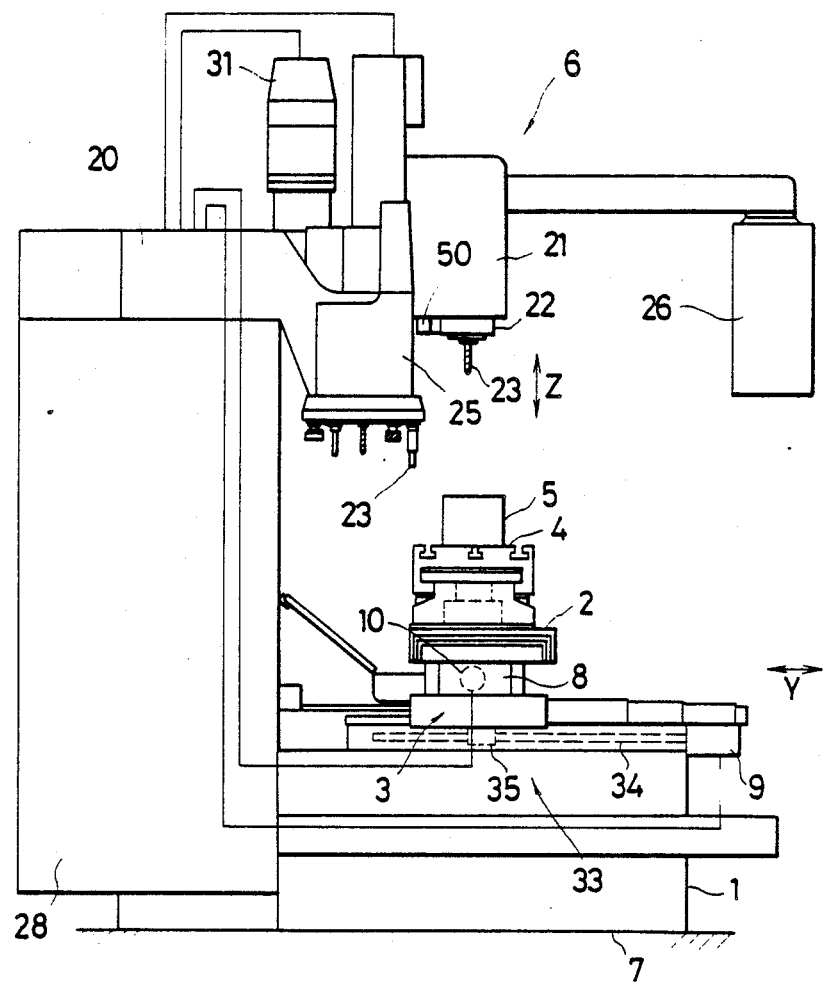
FIG. 2 is a side view showing the machine tool of the invention.
Figure 3:
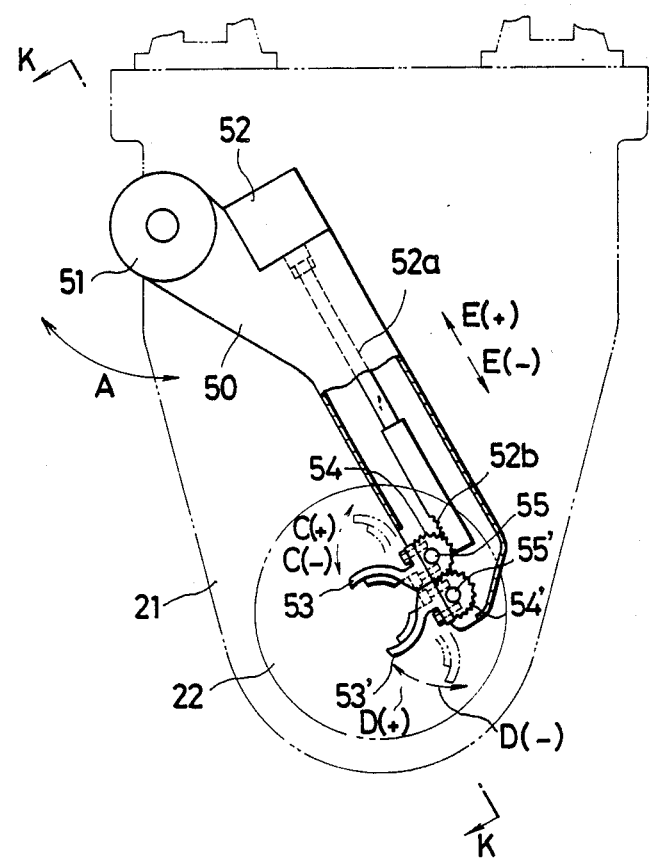
FIG. 3 is a perspective view showing an arm viewed from above a spindle head.

FIGS. 1 and 2 show a machining centre 6 equipped with an automatic tool changer 25. A support 1 has a bed 7 and a saddle 8. A servomotor 9, for movement along the Y-axis, is disposed relative to the bed 7.

A drive means 3 has a servomoter 10 for movement along the X-axis and a ball screw part 11. A table 2 is mounted on the saddle 8. A pallet 4 is detachably attached to the table 2.

A column 20 of the machining centre 6 has a spindle head 21. A tool 23 is set into a spindle 22 of the spindle head 21. The spindle 22 is driven by a motor 24. An arm 50 of the automatic tool changer 25 is secured to the spindle head 21. Details of the automatic tool changer 25 are described later. The column 20 also has an operation panel 26, a CNC-device 27, and a control board 28.

The table 2 is transferred along an X-axis by means of the servomoter 10. A pallet changer (not shown) is optionally located adjacent the table for exchanging pallets.

A feed screw 34 of the ball screw part 33 is connected to the servomoter 9. A nut 35 is mounted on a lower portion of the saddle 8. The saddle 8 is transferred along the X-axis by means of the servomotor 9. The spindle head 21 is transferred along a Z-axis by means of the servomotor 31.

Now, referring to FIGS. 3 to 7, the operation of automatic tool changer 25 is explained.

The arm 50 is secured to the spindle head 21. The arm 50 can rotate about a shaft 51, as shown by the arrow A in FIG. 3. A cylinder 52 is fixed to the arm 50. A pair of claws 53, 53, are disposed at the end of the arm 50. The shape of the claws 53, 53, corresponds to the shape of the tool holder. The claws 53, 53, are fixed to pinions 54, 54', respectively. The pinions 54, 54, can rotate about shafts 55, 55', respectively. The pinion 54 engages the pinion 54, A rack 52b is formed at the end of the rod 52a. The rack 52b engages the pinion 54 which is fixed to the first claw 53.

When the cylinder 52 is operated and the rod 52a is extended in a direction of the arrow E(−), the pinion 54 is rotated clockwise about the shaft 55 as shown by the arrow C(+). Then, the other pinion 54' engaging the pinion 54 is rotated counter-clockwise as shown by the arrow D(−) in FIG. 3. Accordingly, the claws 53, 53' are opened, as shown in phantom outline in FIG. 3. To the contrary, when the rod 52a is retracted in the direction of the arrow E(+), the pinions 54, 54' are rotated counter-clockwise as shown by the arrow C(−), and clockwise as shown by the arrow D(+), respectively. Then, the claws 53, 53' are closed.

Next, referring to FIGS. 4 and 5, the mechanism for moving the arm 50 will be explained.

The arm 50 is fixed to a shaft 51. The shaft 51 has a gear 51a at the intermediate portion thereof. A connecting member 57 is rotatably attached at an end of the shaft 51. The other end of the connecting member 57 is fixed to a rod 56a of a cylinder 56. The cylinder 56 is mounted on a housing of the spindle head 21.

When the rod 56a is retracted, the shaft 51 is moved in a direction of the arrow B(+). Then, the arm 50 withdraws a tool holder 100 set into the spindle 22.

The gear 51a engages a rack 58. The rack 58 can move only in a direction of the arrow F. When the rack 58 is moved in the direction of arrow F, the gear 51a (or the shaft 51) is rotated. Then, the arm 50 is rotated together with the shaft 51.

Figure 5:
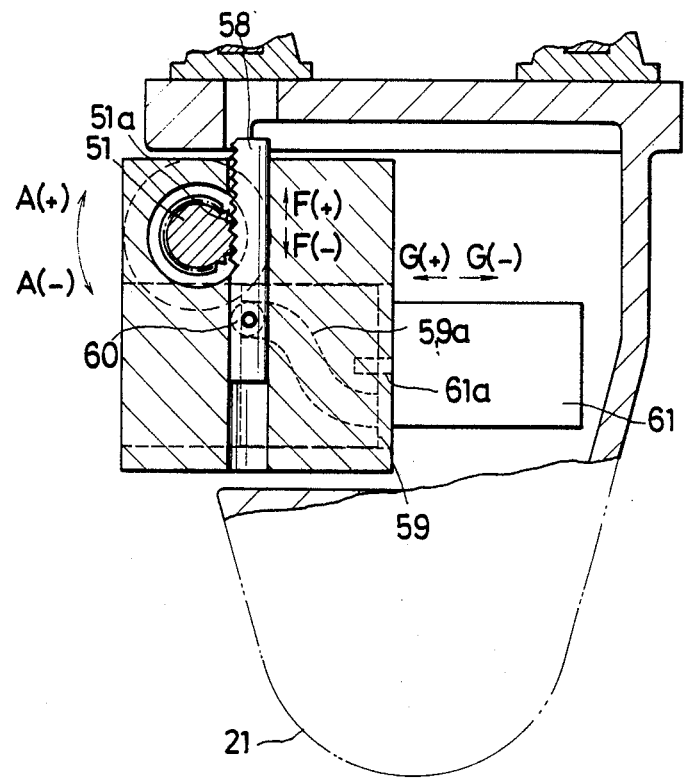
FIG. 5 is a sectional view taken along line M—M in FIG. 4 with certain parts omitted.

Referring to FIG. 5, a cam follower 60 is fixed to the rack 58. The cam follower 60 is of cylindrical shape. The cam follower 60 can rotate about its shaft. The cam follower 60 engages a groove 59a in a cam plate 59. The cam plate 59 is fixed to a rod 61a of a cylinder 61. The cam plate 59 can move only in a direction of the arrow G in FIG. 5.

When the cylinder 61 is operated and the rod 61 is extended or retracted, the cam plate 59 is moved in the direction of the arrows G(+) or G(−). Then, the cam follower 60 is guided by the groove 59a of the cam plane 59, and is moved in a direction of the arrows F(−) or F(+). Accordingly, the gear 51a engaging the rack 58 is rotated in the direction of the arrow A(+) or A(−). The shaft 51 and the arm 50 are also rotated. Thus, when the cylinder 61 is operated, the arm 50 is rotated.

When the arm 50 is rotated by means of the cam and the cam follower 60, the arm 50 can smoothly start or stop without shocks. The mode of the movement in the arm can be controlled by changing the shape of the groove 59a formed in the cam plate 59.

Figure 6:
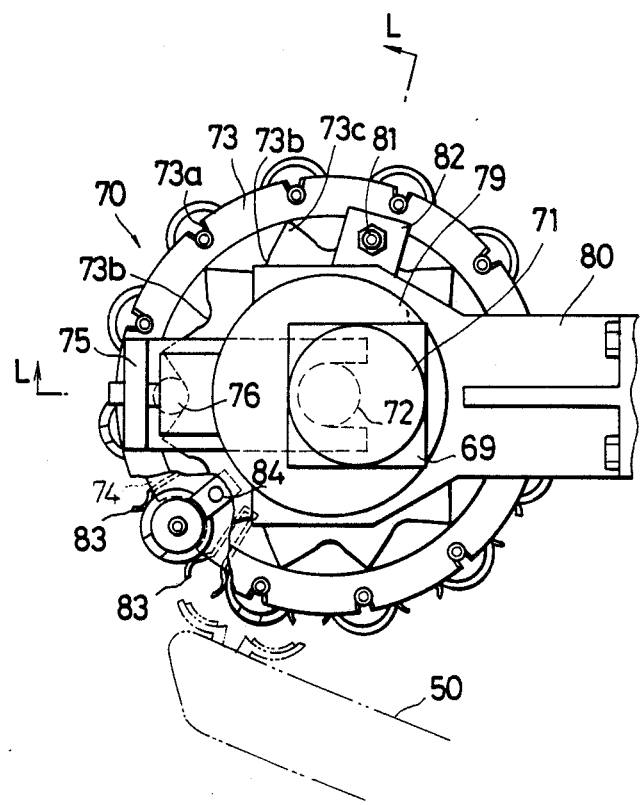
FIG. 6 is a plan view showing a tool magazine.
Figure 7:
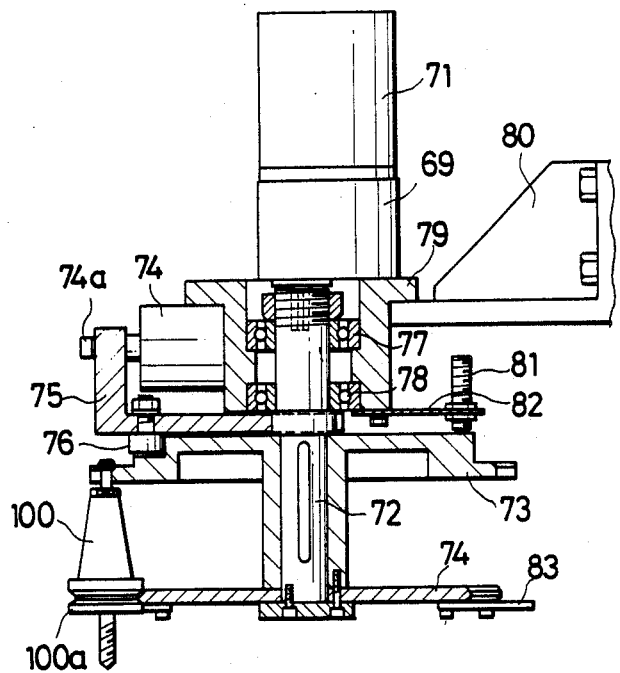
FIG. 7 is a vertical sectional view taken along line L—L in FIG. 6.

Referring to FIGS. 6 and 7, the tool magazine 70 will now be explained. The tool magazine 70 can store twelve tool holders.

Figure 8:
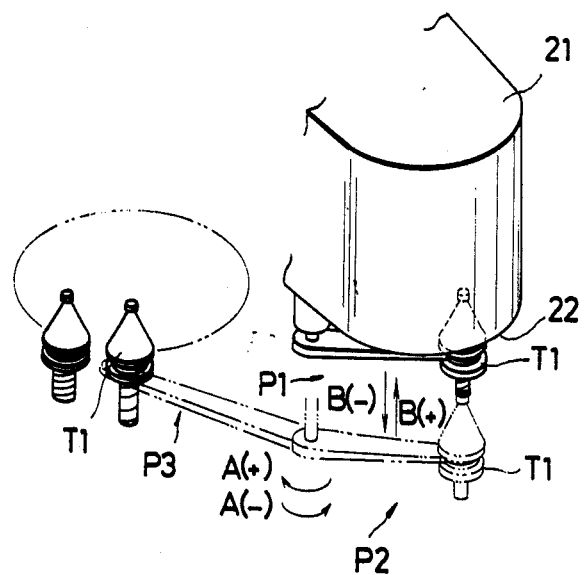
FIG. 8 is a schematic explanatory view showing a tool change operation.

The tool magazine 70 is fixed to the column 20, shown in FIGS. 1 and 2, by means of a magazine bracket 80. The location of the tool magazine 70 is as follows. When the spindle head is located in the tool changing position, the end face of the spindle and the end face of the tool magazine are located at different levels. When a used tool is returned to the tool magazine 70, first the arm grips the used tool set into the spindle; second, the arm 50 moves downward so as to draw the old tool from the spindle 22; and next, the arm 50 is rotated so as to return the old tool into the tool magazine as best seen in FIG. 8.

A shaft 72 is rotatably disposed relative to the magazine bracket 80. The shaft 72 is supported by bearings 77, 78 disposed in a bearing case 79. The bearing case 79 is fixed to the magazine bracket 80.

A reversible motor 71 is connected to the one end of the shaft 72 by means of a gear head 69.

An index plate 73 is fixed to the intermediate portion of the shaft 72. The index plate 73 has a first concave portion 73b for indexing purposes and another concave portion 73a for receiving an end of a tool holder, and an convex portion 73c.

A cylinder 74 is attached to the outside of a bearing case 79. A notch bracket 75 is fixed to a rod 74a of the cylinder 74. A cam follower 76 is attached to the notch bracket 75. A proximity switch 81 is disposed to the bearing case 79 by means of a proximity bracket 82.

A plate 74 is fixed to the other end of the shaft 72. A plurality of plate springs 83 are attached to the periphery of the plate 74. Each of the plate springs 83 has two C-shaped ends. The holding portion 100a of the tool holder is held by two adjoining plate springs 83. A positioning key 84 is attached to the plate 74.

When the reversible motor 71 is operated, the index plate 73 and the tools are rotated. The proximity switch 81 detects the number of the convex portions 73c passing under it. When the predetermined tool is indexed to the tool changing position, the reversible motor 72 is stopped. Next, the cylinder 74 is operated so as to enter the cam follower 76 into the concave portion 73. Thus, the index plate 73 (or the tools) is indexed and locked.

Now referring to FIG. 8, the operation of tool changing in the machine tool is explained.

Assume that a tool T1 is set in the spindle 22. A workpiece is machined by the tool T1. During machining, the arm 50 is located in the position P1 shown in FIG. 8. The rod 52a of the cylinder 52 is extended. The claws 53, 53' are opened, as shown by phantom outline in FIG. 3. Thus, the arm 50 is not a obstacle to rotation of the spindle. When the spindle head 21 moves vertically, the arm 50 moves together with the spindle head 21, because the arm is secured to the spindle head 21. In this case, the arm 50 and the claws 53, 53' are not obstacles to a machining operation.

If the arm 50 is in the position P1 shown in FIG. 8, the arm 50 can grip the tool holder only by closing the claws 53, 53'. During machining, the arm is always in this position P1.

After machining with the tool T1 is completed, the spindle 22 is stopped. The cylinder is operated so that the rod 52a is retracted in the direction of arrow E(+). Then, the claws 53, 53' are closed so as to grip the tool holder set in the spindle. In this manner, the arm 50 can grip the tool holder only by closing the claws 53, 53'. Translation or rotation of the arm 50 is not necessary.

Next, the rod 56a is retracted so that the shaft 51 is moved in the direction of arrow B(+). The arm 50 is moved in the direction of arrow B(+) together with the shaft 51 so that the tool T1 is drawn from the spindle 22.

The cylinder 61 is so operated that the cam plate 59 is moved in the direction of the arrow G(+). The cam follower 60 is guided by the groove 59a and is moved in the direction of the arrow F(−). The gear 51a engaging the rack 58 is rotated clockwise, or in the direction of the arrow A(+) as seen in FIG. 5. The arm 50 is rotated clockwise together with the shaft 51 and is located in the position P3. At this time, the tool T1 is returned to the tool magazine.

When the arm is moved to the position P3, the used tool T1 is fixed to the tool magazine by means of the concave portion 73a and two adjoining plate springs 83. Next, the rod 52a is extended in the direction of arrow E(−) so that the claws 53, 53' are opened. Then, the reversible motor 71 is rotated so that a new tool is indexed to the tool changing position. The arm 50 does not need to retreat from the tool magazine. In other words, the arm 50 does not need to be rotated or translated so as to be away from the tool magazine.

The tool is indexed in the following manner. The reversible motor 71 is rotated. The proximity switch 81 indicates the number of convex portions 73c passing under the switch. When the predetermined number of convex portion 73c are indicated, the reversible motor 71 is stopped. Then the cylinder 74 is so operated that the cam follower 76 fixed to the notched bracket 75 is inserted into the concave portion 73b of the index plate 73.

Accordingly, the new tool is indexed to the tool changing position adjacent the arm 50.

Next, the rod 52a is extended in the direction of arrow E(−) so that the claws 53, 53, are closed to hold the tool holder of the new tool.

The cylinder 61 is so operated that the cam plate 59 is moved in the direction of the arrow G(−). The cam follower 60 is guided by the groove 59a of the cam plate 59 and is moved in the direction of arrow F(+). The rack 58 is moved together with the cam follower 60 in the direction of arrow F(+). The gear 51a is rotated in the direction of arrow A(−) in FIG. 5. The arm 50 is also rotated in the direction of arrow A(−) so as to be in the position P3 from the position P2.

Figure 4:
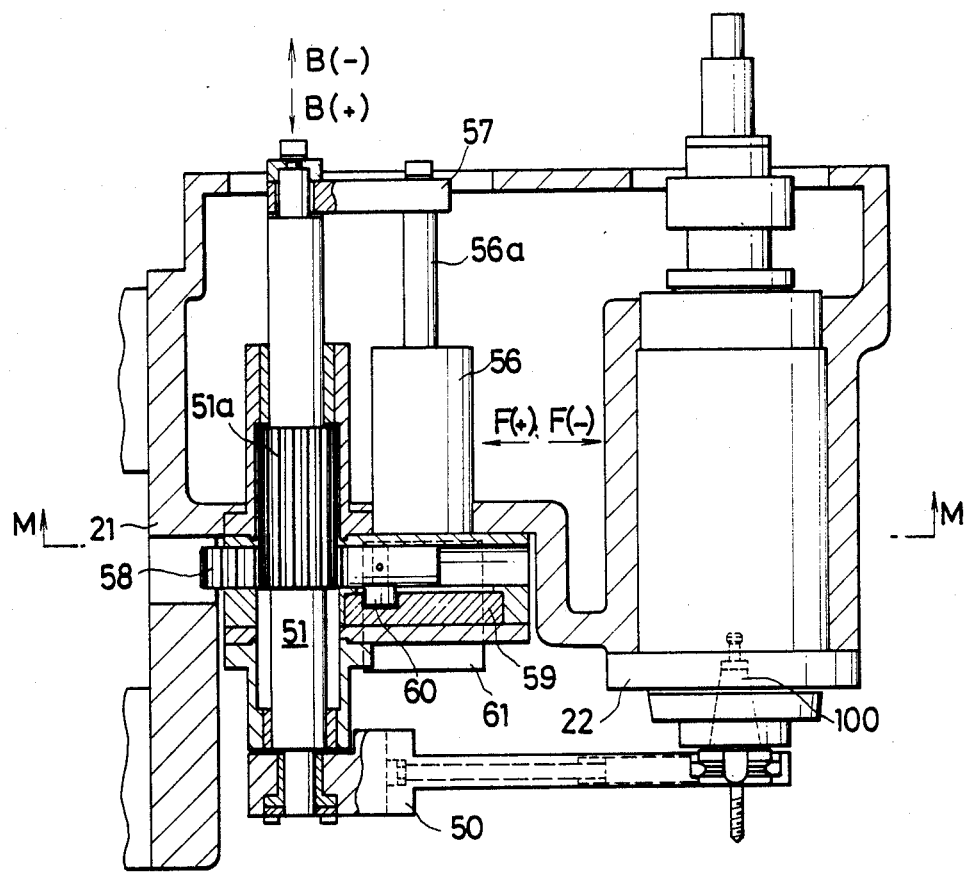
FIG. 4 is a sectional view taken along line K—K in FIG. 3.

The rod 56a is extended in the direction of arrow B(−) so that the arm 50 is also moved in the direction of arrow B(−) in FIG. 4. Accordingly, the arm is transferred to the position P1 from the position P2 so that the new tool is inserted into the spindle 22.

After the new tool is inserted into the spindle 22, the cylinder 52 is operated so that the claws 53, 53' are opened. In this condition, the work is machined with the new tool.

As mentioned before, during machining the arm 50 is located adjacent the spindle 22. So, when machining is over, the arm 50 can grip the tool holder by closing the claws 53, 53'.

The cylinders 52, 56, 61, 74 and the motors 9, 10, 31, 71 are operated by means of an instruction from the CNC-device 27. The operator can also control the cylinders and motors through the operation panel 26.

This invention is not limited to the above-stated embodiment only. For example, this invention can apply in a horizontal machining centre. Further, the tool magazine 70 can be disposed to the spindle head 21.

We claim:

1. A machine tool comprising:
a support;
a column secured on the support;
a spindle head movable mounted on the column, the spindle head having a spindle mounted therein;
a tool changer mounted on the spindle head, the tool changer including
a shaft parallel to the spindle,
first drive means for moving the shaft along its axis,
second drive means for pivoting the shaft about its axis,
an arm secured to an end of the shaft, and
a pair of grip members attached to the arm for gripping a tool holder, said pair of grip members being movable from a closed position in which the grip members grip a tool holder to an open position in which said tool holders are disengaged from any tool holder; and
a tool magazine for storing a plurality of tools having tool holders, the tool magazine including
a bracket fixed to the column,
a magazine shaft rotatably mounted on the bracket about a vertical axis,
an upper plate fixed on the magazine shaft, the upper plate having a plurality of concave portions formed on the periphery thereof for supporting an upper portion of a tool holder,
a lower plate fixed on the shaft, the lower plate having a plurality of spring retainers attached on the periphery thereof for retaining a lower holding portion of the tool holder,
third drive means for rotating the magazine shaft, and
indexing means for indexing the first and second plates to a desired position,
wherein, during a machining operation, the tool changer with the grip members in the open position is located in a first waiting position near the spindle, where the tool changer can grip a tool holder in the spindle by closing the grip members, and wherein the tool holder in the spindle is returned to the tool magazine in the following steps:
the grip members of the tool changer located in the first waiting position are moved to the closed position so as to grip the tool holder in the spindle; the tool changer is moved in a direction parallel to the spindle so as to draw the tool holder from the spindle; and the tool changer is pivoted about its shaft so as to return the tool holder to the tool magazine.

2. A machine tool according to claim 1, wherein the tool magazine has an end face at a level spaced from the level of the spindle in the direction in which the tool changer draws a tool holder from the spindle; wherein, during indexing of a new tool holder by said indexing means, the tool changer with the grip members opened is located in a second waiting position near the tool magazine where the tool changer can grip an indexed tool holder by closing the grip members, and wherein an indexed tool holder in the tool magazine is transferred to the spindle from the tool magazine in the following three steps:
first, the grip members of the tool changer located in the second waiting position near the tool magazine are closed so as to grip the indexed tool; second, the tool changer is swiveled so as to transfer the tool holder to a position beneath the spindle; and third, the tool changer is moved upward so as to insert the new tool holder into the spindle.

3. A machine tool according to claim 1, wherein the first drive means includes cylinder means mounted on the spindle head.

4. A machine tool according to claim 1, wherein the second drive means includes a pinion on the shaft, a reciprocatable rack engaging the pinion, and rack drive means for reciprocating the rack.

5. A machine tool according to claim 4, wherein the rack drive means includes a cam plate having a groove formed therein, a cam follower attached to the rack, said cam follower engaging the groove of the cam plate, and cylinder means for reciprocating the cam plate.

6. A machine tool according to claim 5, wherein the groove has a shape comprising means for smoothly starting and stopping the arm without shocks.

7. A machine tool according to claim 1, wherein each of the grip members has a claw corresponding in shape to the holding portion of the tool holder, and wherein the grip members are actuated by drive means comprising a pair of pinions each secured to one end of the claw and engaging the other, a rack engaging one of the pinions, and cylinder means fixed to the arm for reciprocating the rack.

8. A machine tool according to claim 1, wherein the indexing means includes and index plate fixed to the shaft of the tool magazine, cylinder means having a rod and a cam follower fixed at an end of the rod, the index plate having a plurality of concave portions formed in the periphery thereof, whereby the cam follower can be inserted into the concave portion so that the index plate and, consequently, the first and second plates, are locked at desired positions.

9. A machine tool comprising:
   a support;
   a spindle head movably mounted on the support between a tool changing position and an operating position;
   a spindle mounted for rotation in the spindle head, the spindle head being movable in a direction parallel to the axis of rotation of the spindle;
   a tool changer mounted on the spindle head for moving tools between the spindle and magazine means; and
   magazine means for holding at least one tool;
   said tool changer comprising means for moving a tool from a first position, in which the tool is connected to the spindle, to a second position, in which the tool is retained by the magazine means, in a motion consisting of two components:
      a first component in a direction parallel to the axis of rotation of the spindle for drawing a tool out of the spindle when the spindle head is in its tool changing position; and
      a second component in a plane substantially orthogonal to the axis of rotation of the spindle.

10. A method of changing a tool in a machine tool having a spindle head, a spindle mounted for rotation in the spindle head, a magazine spaced from the spindle, and a tool changer including an arm, comprising:
    moving the arm in a motion consisting of two components to transport the tool from the spindle to the magazine:
       a first component parallel to the axis of rotation of the spindle, and
       a second component in a plane substantially orthogonal to the axis of rotation of the spindle.

* * * * *